United States Patent
Everton

(10) Patent No.: US 10,893,009 B2
(45) Date of Patent: Jan. 12, 2021

(54) EMAIL FRAUD PREVENTION

(71) Applicant: eTorch Inc., Chicago, IL (US)

(72) Inventor: Paul Everton, Chicago, IL (US)

(73) Assignee: eTorch Inc., Chicago, IL (US)

( * ) Notice: Subject to any disclaimer, the term of this patent is extended or adjusted under 35 U.S.C. 154(b) by 350 days.

(21) Appl. No.: 15/872,078

(22) Filed: Jan. 16, 2018

(65) Prior Publication Data
US 2018/0234368 A1    Aug. 16, 2018

Related U.S. Application Data

(60) Provisional application No. 62/459,863, filed on Feb. 16, 2017.

(51) Int. Cl.
*H04L 12/58* (2006.01)
*G06Q 10/10* (2012.01)
*G06Q 50/30* (2012.01)

(52) U.S. Cl.
CPC .......... *H04L 51/10* (2013.01); *G06Q 10/107* (2013.01); *H04L 51/12* (2013.01); *G06Q 50/30* (2013.01); *H04L 51/22* (2013.01)

(58) Field of Classification Search
CPC ......... H04L 51/10; H04L 51/12; H04L 51/22; G06Q 10/107; G06Q 50/30
USPC .................................................. 709/206
See application file for complete search history.

(56) References Cited

U.S. PATENT DOCUMENTS

| | | | | |
|---|---|---|---|---|
| 2005/0050150 A1* | 3/2005 | Dinkin | ............... | G06Q 10/107 709/207 |
| 2006/0179005 A1* | 8/2006 | Li | ............... | H04L 63/1483 705/64 |
| 2006/0230272 A1* | 10/2006 | Lawrence | ............ | H04L 63/126 713/176 |
| 2007/0162366 A1* | 7/2007 | Tanaka | ............... | G06Q 40/00 705/35 |
| 2008/0091765 A1* | 4/2008 | Gammage | ............... | G06T 7/40 709/202 |
| 2009/0119143 A1* | 5/2009 | Silver | ............... | G06Q 30/02 705/51 |
| 2009/0217027 A1* | 8/2009 | Ayalon | ............... | H04L 9/083 713/150 |
| 2009/0235069 A1* | 9/2009 | Sonnega | ............... | H04L 63/062 713/156 |
| 2009/0292925 A1* | 11/2009 | Meisel | ............... | H04L 63/0876 713/176 |

(Continued)

*Primary Examiner* — Tauqir Hussain
(74) *Attorney, Agent, or Firm* — Nutter McClennen & Fish LLP

(57) ABSTRACT

A mail transfer agent comprises processing circuitry, storage circuitry, and networking circuitry. The storage circuitry holds a database. The networking circuitry is operable to receive, via a network connection, an email message. The processing circuitry is operable to analyze the email message to detect an image present in the email message. The processing circuitry is operable to determine, based on one or more records of the database, that the detected image is associated with a particular brand, and process the email message based on whether one or more characteristics of the email message are associated with the particular brand in the database. The one or more characteristics of the email message may comprise one or more of: sender domain, sender subdomain, and sender IP address.

12 Claims, 4 Drawing Sheets

(56) References Cited

U.S. PATENT DOCUMENTS

| | | | |
|---|---|---|---|
| 2009/0328187 A1* | 12/2009 | Meisel | H04L 63/0218 |
| | | | 726/13 |
| 2013/0086677 A1* | 4/2013 | Ma | H04L 63/1483 |
| | | | 726/22 |
| 2015/0067839 A1* | 3/2015 | Wardman | G06F 21/563 |
| | | | 726/22 |
| 2016/0142439 A1* | 5/2016 | Goutal | H04L 63/1425 |
| | | | 726/22 |
| 2016/0180468 A1* | 6/2016 | Buss | G06Q 40/08 |
| | | | 705/4 |
| 2017/0078321 A1* | 3/2017 | Maylor | H04L 63/1433 |

* cited by examiner

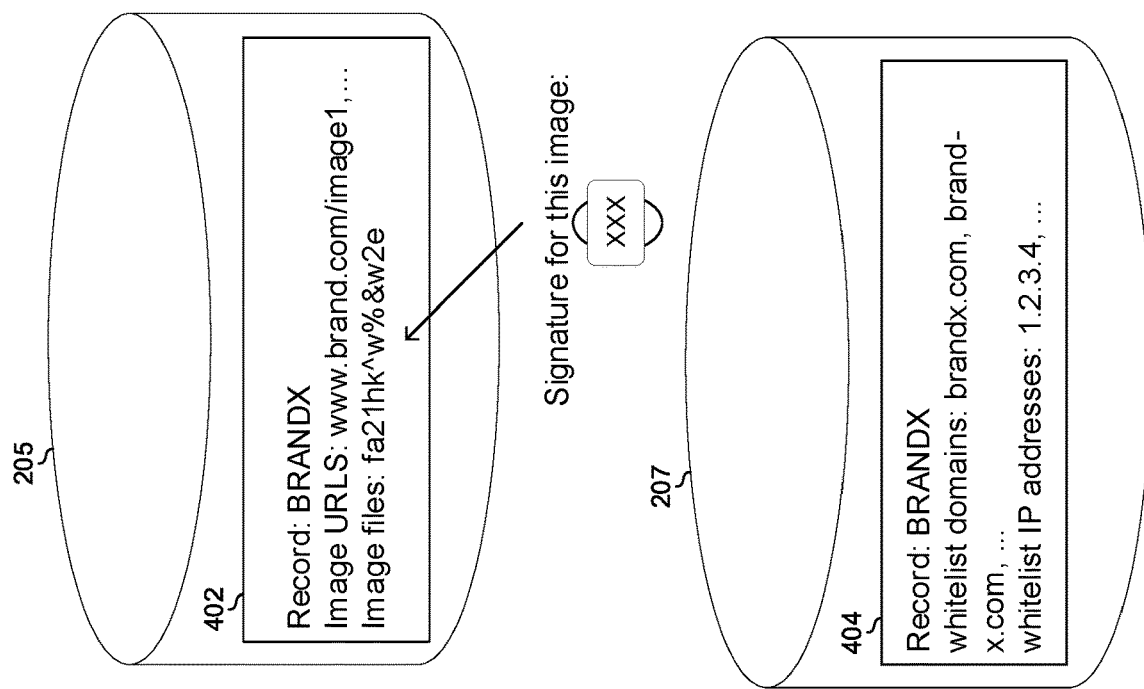
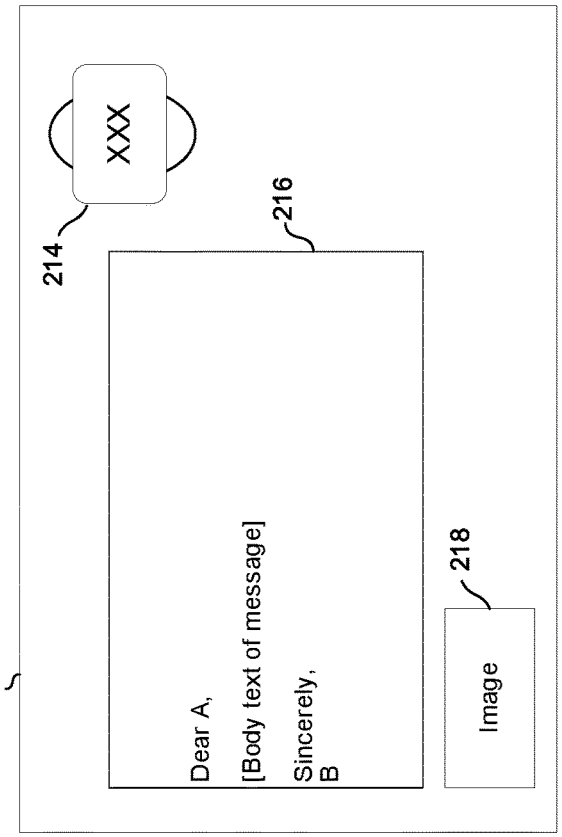
FIG. 4

EMAIL FRAUD PREVENTION

PRIORITY CLAIM

This application claims the benefit of priority to U.S. provisional patent 62/459,863 filed Feb. 16, 2017.

BACKGROUND

Limitations and disadvantages of conventional approaches to email fraud prevention will become apparent to one of skill in the art, through comparison of such approaches with some aspects of the present method and system set forth in the remainder of this disclosure with reference to the drawings.

BRIEF SUMMARY

Methods and systems are provided for email fraud prevention, substantially as illustrated by and/or described in connection with at least one of the figures, as set forth more completely in the claims.

BRIEF DESCRIPTION OF THE DRAWINGS

FIG. 4 illustrates process for email fraud prevention in accordance with aspects of this disclosure.

DETAILED DESCRIPTION

Figure 1:
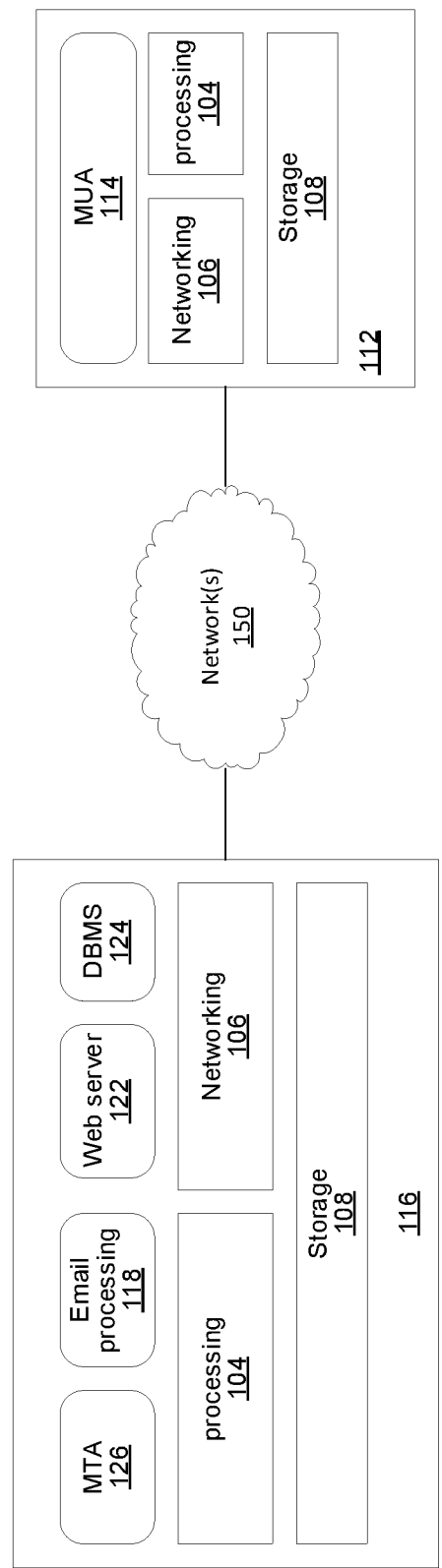
FIG. 1 illustrates an example system configured to prevent email fraud in accordance with aspects of this disclosure.

FIG. 1 illustrates an example system configured to provide secure electronic communications. The system comprises an email processing backend 116 and a mail user agent (MUA) 112 communicatively coupled via one or more network(s) 150 (e.g., a local area network (LAN) and/or a wide area network (WAN) such as the Internet).

The email processing backend 116 comprises processing circuitry 104 (e.g., a chipset or system on chip comprising a CPU, memory, graphics processor, I/O controller, etc.), networking circuitry 106 (e.g., Ethernet, Wi-Fi, and/or the like) and storage circuitry 108 (e.g., HDD, SSD, and/or the like, and associated control/drive circuitry) configured (e.g., via an application specific circuit, software, and/or firmware) to operate as an MTA 126, email processing circuitry 118, web server circuitry 122, and database management system (DBMS) 124 (for simplicity of description, the DBMS 124 and an underlying database(s) in storage circuitry 108 is referred to as simply database 124). The email processing backend 116, or components thereof, may reside on one or more servers of a public, private, or hybrid cloud infrastructure.

The device 112 comprises processing circuitry 104 (e.g., a chipset or system on chip comprising a CPU, memory, graphics processor, I/O controller, etc.), networking circuitry 106 (e.g., Ethernet, Wi-Fi, SMS gateway, and/or the like) and storage circuitry 108 (e.g., HDD, SSD, and/or the like, and associated control/drive circuitry) configured (e.g., via an application specific circuit, software, and/or firmware) to operate as a mail user agent (MUA) 114 (also referred to as an "email client"). For example, MUA 114 may be a locally-installed MUA (e.g., Outlook, Apple iOS mail, or the like) or may be a "webmail" type MUA running in a web browser (e.g., gmail.com®, outlook.com®, and/or the like). For purposes of illustration, it is assumed the MTA 116 handles email for the domain rxdomain.com, and the MUA is for User@txdomain.com (i.e., a user on a different domain).

The MTA 126 is configured to send and receive email messages via the networking circuitry 106 (e.g., using SMTP, IMAP, POP3, MAPI, and/or the like).

The email processing circuitry 118 is operable to process emails (e.g., parse/analyze and/or modify text and/or images in email body and/or attachments) received from the MTA 126, route the processed emails to appropriate locations in the database 124 (e.g., user mailboxes and/or quarantine), generate emails to be sent via the MTA 126, and store and retrieve data to/from the database 124.

Figure 2:
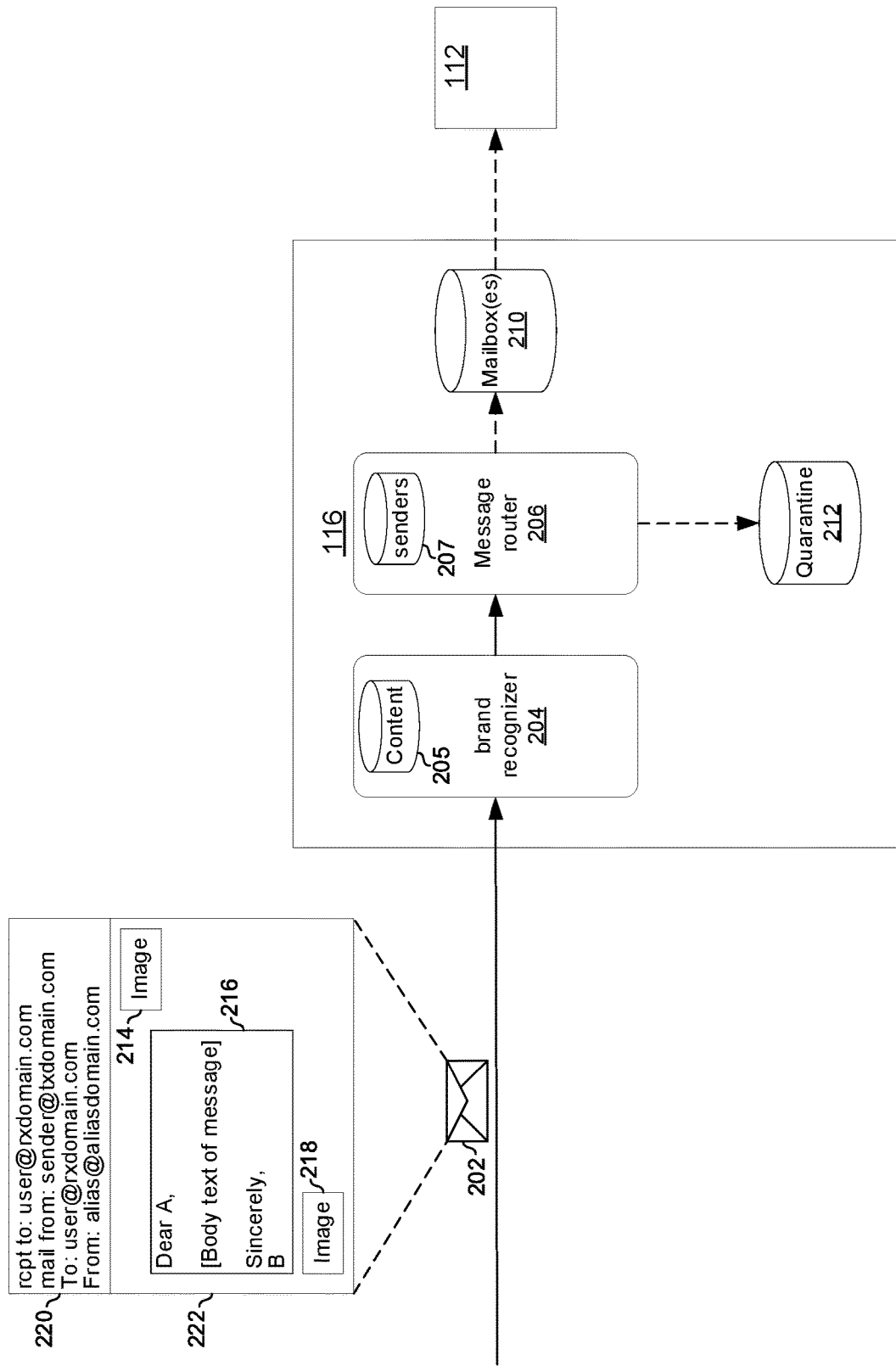
FIG. 2 illustrates processing of an example email flowing the system of FIG. 1.

FIG. 2 illustrates processing of an example email flowing through the system of FIG. 1. The brand recognizer 204 and message router 206 may be functions of email processing circuitry 118, for example. The brand content database 205, brand senders database 207, mailbox(es) 210, and quarantine 212 may be part of database 124, for example (e.g., databases 205 and 207 may be tables of database 124).

The brand recognizer 204 is operable to analyze email content (e.g., the visible body text, the raw HTML, embedded images, linked-to images, and/or attachments) in combination with brand content database 205 to detect whether an email purports to be associated with a particular brand. The brand content database 205 may comprise known-good (e.g., known to be malware free and from a trustworthy sender) and/or known-bad (e.g., known to be associated with a phishing scam) content associated with various brands (e.g., banks, shippers, retailers, and/or any other brand which may be used as part of a phishing scam). In an example implementation, the database 205 stores logos and/or other images or design marks associated with particular brands, and the brand recognizer 204 is operable to analyze images in emails to detect images that are associated with particular brands. Images stored may, for example, be stored in the database 205 in the form of an image file (e.g., of any suitable image format such as bitmap, jpeg, svg, etc.), or in the form of a hash of an image file. Images stored in the database 205 may be authorized or known-good (i.e., images that are known to be legitimate images from the brand), and/or may be unauthorized or known-bad (e.g., images that are known to be forgeries or unauthorized copies). The brand recognizer 204 may use "machine vision" techniques such as stitching/registration, filtering, thresholding, pixel counting, segmentation, edge detection, color analysis, blob detection and extraction, neural net/deep learning pattern recognition, optical character recognition, and the like.

The message router 206 routes email messages received from brand recognizer 204 to recipient mailbox(es) 210 and/or to quarantine 212. The routing may be based, at least in part, on the result of analysis performed by the brand recognizer 204. The routing may be based, at least in part on the brand senders database 207 (e.g., part of database 124). The brand senders database 207 may be populated, at least in part, by brands' sender policy framework (SPF) records in the DNS records for their domains.

For illustration of the operation of brand recognizer 204 and message router 206, shown in FIG. 2 is an example email message 202 where the content of the MAIL FROM field in the SMTP envelope 220 is sender@txdomain.com, the content of the "from" message header is alias@aliasdomain.com, the content of the RCPT TO field in the SMTP envelope 220 is user@rxdomain.com, and the content of the "to" message header is alias@aliasdomain.com. The message body 222 of the email message 202 comprises image 214, text 216, and image 218. Each of the images may be a CID embedded image (via an <img src=cid . . . > tag), a BASE64 inline embedded image, or a remote linked image (via an <img src=http:// . . . > tag).

Where, for example, the brand recognizer 204 detects that either or both of image 214 and image 218 is/are associated with a particular brand ("BRAND") (e.g., the images are or contain BRAND's logo, BRAND's name, a trademark owned by BRAND, and/or the like), the message router 206 looks up BRAND's authorized senders and/or authorized sending IP addresses in the database 207. Where a brand has multiple domains, the database 207 may have this information for the multiple domains. If the lookup reveals that sender@txdomain.com is authorized to send emails on behalf of BRAND and/or the email message 202 was sent from an IP address authorized to send on behalf of BRAND, then the message 202 may be routed to the mailbox 210 of user@rxdomain.com. On the other hand, if the lookup reveals that sender@txdomain.com is not authorized to send emails on behalf of BRAND and/or the email message 202 was sent from an IP address not authorized to send on behalf of BRAND, then the message 202 may be routed to the quarantine 212. Alternatively, or additionally, the email message 202 may be delivered to the mailbox 210 of user@rxdomain.com, but only after the email message 202 has been modified to reduce its risk. The modification may include, for example, inserting warning text or a warning image in the email message 202, removing and/or replacing any URLs in the email message 202, converting the email message 202 from HTML-format to plain text format, stripping any attachments, and/or the like.

In an example implementation, when the email message 202 is delivered to the quarantine 212, a network administrator may be alerted so that the network administrator can inspect the email to confirm that it was a phishing email (and take appropriate action) or mark it as a false positive. In either event, the brand content database 205 and/or brand senders database 207 may be updated to reflect the ultimate disposition of the email message 202 (e.g., update a list of known-bad domains, known-bad senders, known-bad IP addresses, known-good domains, known-good senders, known-good IP addresses, known-bad images, known-good images, and/or the like for BRAND).

Figure 3:
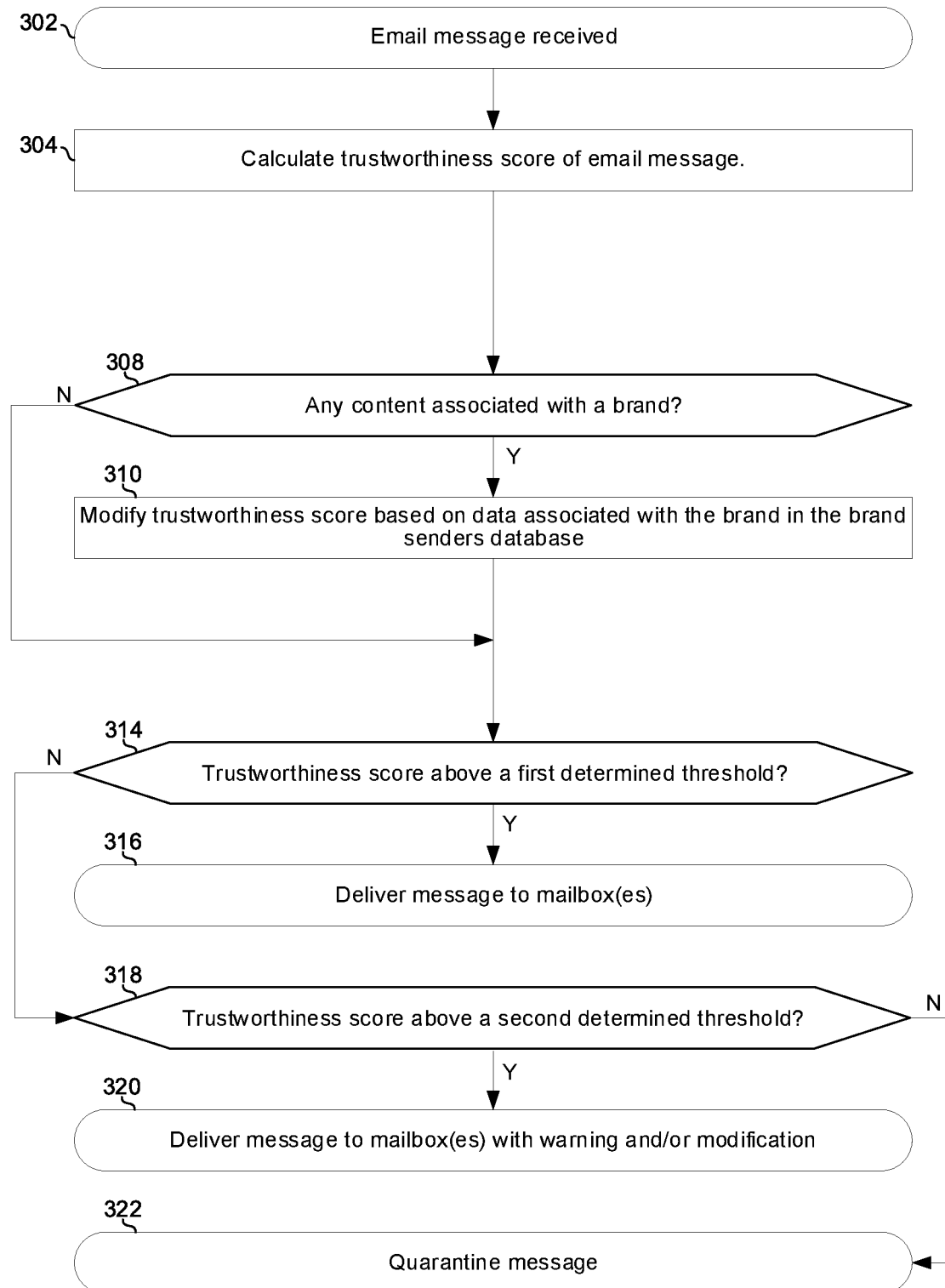
FIG. 3 is a flowchart illustrating an example process for email fraud prevention in accordance with aspects of this disclosure.

FIG. 3 is a flowchart illustrating an example process for email fraud prevention in accordance with aspects of this disclosure. In an example implementation, the process is performed by the message router 206.

The process begins with block 302 in which the email message 202 arrives at email processing backend 116.

In block 304, a trustworthiness score of the email message 202 is calculated. The score may be based on, for example, any one or more of: the SMTP envelope, the message headers, the message body, the message attachments (if any), the presence of certain words or expressions in the email message, the sender domain, the sender IP address, DMARC policy associated with txdomain.com, DKIM policy, and/or any other characteristics.

In block 308, it is determined the email message 202 contains content associated with a brand in the database 205. The determination may, for example, be based on whether the email 202 contains any images that match logos or other images or text in the brand content database 205. Criteria for an image match may be the image having a threshold number of features (e.g., corners, blobs, edges, ridges, color histograms, histograms of oriented gradients, text, and/or the like.) in common with an image associated with the brand in the brand database 205. As another example, the determination of whether the email message 202 contains content associated with any brand in the brand database 205 may be based on whether the email 202 contains any URL that is sufficiently similar to a URL in the brand content database 205. Criteria for a URL match may be, for example, full string match, substring match (e.g., domain or subdomain), regex match, close misspelling, and/or the like. If the email does contain content associated with a brand, then the process advances to block 310.

For example, referring briefly to the example shown FIG. 4, shown are an example record 402 of the brand content database 205 and an example record 404 of the senders database 207. The record 402 indicates that the image URL www.brand.com/image1 is associated with BRANDX, and that an image with the signature "fa21hk^w %&w2e" (e.g., generated with a hashing algorithm) is associated with BRANDX. In the example shown, the message router 206 determines, based on analysis of image 214 and lookup of record 402, that the image 214 in the email message 202 is associated with BRANDX. This may be determined based on, for example, extracted features of the logo (e.g., a rounded rectangle of particular dimensions and/or colors overlaid on an oval of particular dimensions and/or colors and having the characters "XXX") converted to a hash that matches the hash in the record 402. The message router 406 then looks up record 404 in database 207 to find that the domains brand.com and brand-x.com, and the IP address 1.2.3.4 are associated with BRANDX.

Returning to FIG. 3, in block 310, the trustworthiness score calculated in block 304 is modified based on data (e.g., SPF records) associated with the brand in the brand senders database 207. For example, in response to detecting that the email 202 contained content associated with BRANDX in the database 205, the message router 206 may perform additional processing of the email 202. The trustworthiness score of the email 202 may be modified based on the additional analysis. The email 202 may be routed based on the trustworthiness score.

As an example, the additional processing may comprise inspecting the headers of the email messages 202 to determine the sender's email address, domain, IP address, and/or other information and then see if that information is on a whitelist or blacklist in the senders database 207. The database 207 may comprise one or more brand-specific whitelists (a whitelist applicable only to a specific brand or brands), one or more brand-agnostic whitelists (a whitelist applicable only to all brands), one or more brand-specific blacklists, and/or one or more brand-agnostic blacklists. The trustworthiness score may be decreased if sender's email address, domain, IP address, and/or other information is on a blacklist in database 207 or increased if the sender's email address, domain, IP address, and/or other information is on a whitelist in database 207.

As another example, the additional processing may comprise comparing all URLs in the email 202 to URLs on a whitelist and/or blacklist in the database 207. The trustworthiness score may be decreased if a URL is on a blacklist in database 207, increased if no URLs are on a blacklist, or increased if a URL is on a whitelist in database 207.

As another example, the additional processing may comprise replacing URLs and/or other content in the email 202 with replacement content such as described in U.S. patent application Ser. No. 15/613,343, which is hereby incorporated herein by reference. In an example implementation, such content replacement may be performed only if and when the trustworthiness score falls below a determined threshold (e.g., because of detection of a forged BRANDX logo in the email 202).

After block 310, the process advances to block 314.

Returning to block 308, if the email 202 does not contain content associated with a brand in the brand content database 205, the process advances to block 314.

In block 314, if the trustworthiness score is above a first determined threshold, then, in block 316, the message is delivered to the recipient(s) mailbox(es). If the trustworthiness score is not above the first determined threshold, then the process advances to block 318.

In block 318, if the trustworthiness score is above a second determined threshold, then, in block 320, the email message 202 is modified (e.g., to add a warning text or image) prior to being delivered to the recipient(s) mailbox(es). The email 202 may also be delivered to the quarantine for further analysis (automated or manual). If the trustworthiness score is not above the second determined threshold, then the process advances to block 322 and the message is delivered to the quarantine.

In accordance with an example implementation of this disclosure, an email processing backend comprises processing circuitry, storage circuitry, and networking circuitry. The networking circuitry is operable to receive, via a network connection, an email message. The processing circuitry is operable to analyze the email message to detect an image present in the email message. The processing circuitry is operable to perform feature extraction on the detected image(s) and determine whether the image matches any images in a brand content database in the storage circuitry. If the image does match an image associated with a particular brand in the brand content database, looking up information for the particular brand in a brand senders database. Determining whether to deliver the email message to a recipient mailbox based whether one or more fields of the email message's SMTP envelope and/or one or more message headers of the email message are and/or are not a match for corresponding fields associated with the particular brand in the brand senders database.

In accordance with an example implementation of this disclosure, the detection, in an email message, of an image that is a match for an image in a record in a brand content database triggers additional analysis on the email message that are not performed on email messages that do not contain any image that is a match for an image in the brand content database. Where the matching image in the brand content database is associated with a particular brand, the additional analysis may comprise checking all URLS in the email message against a whitelist and/or blacklist of domains and/or URLs associated with the particular brand in a brand content database and/or brand senders database. Where the matching image in the brand content database is associated with a particular brand, the additional analysis may comprise checking whether the IP address from which the email message was sent is on a whitelist or blacklist associated with the particular brand in the brand senders database.

In accordance with an example implementation of this disclosure, a mail transfer agent (e.g., 116) comprises processing circuitry (e.g., 104), storage circuitry (e.g., 108), and networking circuitry (e.g., 106). The storage circuitry holds a database (e.g., 205 and 207). The networking circuitry is operable to receive, via a network connection, an email message (e.g., 202). The processing circuitry is operable to analyze the email message to detect an image present in the email message (e.g., 214). The processing circuitry is operable to determine, based on one or more records of the database (e.g., 402 and/or 404), that the detected image is associated with a particular brand, and process the email message based on whether one or more characteristics of the email message are associated with the particular brand in the database (e.g., in record 404). The one or more characteristics of the email message may comprise one or more of: sender domain, sender subdomain, and sender IP address. The processing of the email message may comprise a routing of the email message to a quarantine (e.g., 212) if the one or more characteristics of the email message are not associated with the particular brand in the database. The processing of the email message may comprise a reduction of a trustworthiness score (e.g., stored in 210) of the email message if the one or more characteristics of the email message are not associated with the particular brand in the database. The processing of the email message may comprise an insertion of warning text and/or image in the email message if the one or more characteristics of the email message are not associated with the particular brand in the database. The processing circuitry may be operable to process the detected image using machine vision algorithms to extract features of the detected image, and the determination that the detected image is associated with the particular brand may be based on the extracted features. The network connection may be a simple mail transfer protocol (SMTP) connection. The processing of the email message may comprises an increase of a trustworthiness score of the email message if the one or more characteristics of the email message are associated with the particular brand in the database. The processing of the email message may comprise a routing of the email message to a recipient mailbox if the one or more characteristics of the email message are associated with the particular brand in the database.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. The machine-readable medium may be accessible via a network (e.g., the Internet) such that when the code is downloaded and installed on local machines, the local machines are configured into a system as described in this disclosure, and when the code is executed by such system, the system performs processes described in this disclosure.

While the present method and/or system has been described with reference to certain implementations, it will be understood by those skilled in the art that various changes may be made and equivalents may be substituted without departing from the scope of the present method and/or system. In addition, many modifications (e.g., re-ordering of flowchart blocks) may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
    processing circuitry, storage circuitry, and networking circuitry of a mail transfer agent,
    wherein:
        the storage circuitry holds a database;
        the networking circuitry is operable to receive, via a network connection, an email message;
        the processing circuitry is operable to analyze the email message to detect an image present in the email message; and
        the processing circuitry is operable to:
            determine, based on one or more records of the database, that the detected image is associated with a particular brand; and
            process the email message based on whether one or more characteristics of the email message are associated with the particular brand in the database.

2. The system of claim 1, wherein the processing of the email message comprises a routing of the email message to a quarantine if the one or more characteristics of the email message are not associated with the particular brand in the database.

3. The system of claim 2, wherein the one or more characteristics of the email message comprise one or more of: sender domain, sender subdomain, and sender IP address.

4. The system of claim 1, wherein the processing of the email message comprises a reduction of a trustworthiness score of the email message if the one or more characteristics of the email message are not associated with the particular brand in the database.

5. The system of claim 4, wherein the one or more characteristics of the email message comprise one or more of: sender domain, sender subdomain, and sender IP address.

6. The system of claim 1, wherein the processing of the email message comprises an insertion of warning text and/or image in the email message if the one or more characteristics of the email message are not associated with the particular brand in the database.

7. The system of claim 6, wherein the one or more characteristics of the email message comprise one or more of: sender domain, sender subdomain, and sender IP address.

8. The system of claim 1, wherein:
    the processing circuitry is operable to process the detected image using machine vision algorithms to extract features of the detected image; and
    the determination that the detected image is associated with the particular brand is based on the extracted features.

9. The system of claim 1, wherein the processing of the email message comprises an increase of a trustworthiness score of the email message if the one or more characteristics of the email message are associated with the particular brand in the database.

10. The system of claim 9, wherein the one or more characteristics of the email message comprise one or more of: sender domain, sender subdomain, and sender IP address.

11. The system of claim 1, wherein the processing of the email message comprises a routing of the email message to a recipient mailbox if the one or more characteristics of the email message are associated with the particular brand in the database.

12. The system of claim 11, wherein the one or more characteristics of the email message comprise one or more of: sender domain, sender subdomain, and sender IP address.

* * * * *

UNITED STATES PATENT AND TRADEMARK OFFICE
CERTIFICATE OF CORRECTION

PATENT NO. : 10,893,009 B2
APPLICATION NO. : 15/872078
DATED : January 12, 2021
INVENTOR(S) : Paul Everton Page 1 of 1

It is certified that error appears in the above-identified patent and that said Letters Patent is hereby corrected as shown below:

In the Claims

At Column 7, Claim number 1, Line number 18, please insert after "database" -- , wherein the one or more characteristics of the email message comprise one or more of: sender domain, sender subdomain, and sender IP address, and
       wherein the network connection is a simple mail transfer protocol (SMTP) connection. --

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*